US011725518B2

United States Patent
Skura et al.

(10) Patent No.: US 11,725,518 B2
(45) Date of Patent: Aug. 15, 2023

(54) METHOD FOR MACHINING A BLADE AND A BLADE FOR A TURBOMACHINE

(71) Applicant: MTU Aero Engines AG, Munich (DE)

(72) Inventors: Krzysztof Skura, Majdan Krolewski (PL); Martin Pernleitner, Dachau (DE); Christian Eichler, Olching (DE); Lutz Friedrich, Munich (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 17/170,309

(22) Filed: Feb. 8, 2021

(65) Prior Publication Data

US 2021/0246793 A1    Aug. 12, 2021

(30) Foreign Application Priority Data

Feb. 11, 2020 (EP) .................... 20156507

(51) Int. Cl.
  *F01D 5/14* (2006.01)
  *F01D 5/22* (2006.01)
  *B23P 15/02* (2006.01)
  *B23H 9/10* (2006.01)
  *B23C 3/18* (2006.01)

(52) U.S. Cl.
  CPC .......... *F01D 5/141* (2013.01); *F05D 2230/10* (2013.01)

(58) Field of Classification Search
  CPC . F01D 5/147; F01D 5/225; F01D 5/20; F01D 11/08; F05D 2240/307; F05D 2220/32; F05D 2240/126; F05D 2240/80; F05D 2260/22141; F05D 2250/70; F05B 2240/33
  See application file for complete search history.

(56) References Cited

U.S. PATENT DOCUMENTS

| | | | |
|---|---|---|---|
| 5,531,568 A * | 7/1996 | Broadhead | F01D 5/186 415/115 |
| 6,491,498 B1 | 12/2002 | Seleski et al. | |
| 9,683,446 B2 | 6/2017 | Shaffer | |
| 9,797,264 B2 | 10/2017 | Boeck | |
| 10,190,423 B2 | 1/2019 | Plante et al. | |
| 2016/0237829 A1* | 8/2016 | Kozdras | F04D 29/388 |
| 2020/0141576 A1* | 5/2020 | Folkers | F23R 3/46 |

FOREIGN PATENT DOCUMENTS

| EP | 3056677 A1 | 8/2016 |
|---|---|---|
| EP | 3521562 A1 | 8/2019 |

* cited by examiner

*Primary Examiner* — Eric J Zamora Alvarez
(74) *Attorney, Agent, or Firm* — Hinckley, Allen & Snyder, LLP; David R. Josephs

(57) ABSTRACT

A method for machining a blade and a blade for a turbomachine comprising a shroud which is positioned on a tip side of the blade. The shroud has an outer surface with at least one circumferential fin arranged thereon, whereby at least one section of the outer surface beside the at least one fin is processed in at least two manufacturing steps. At least one first section of the outer surface is processed to have a first shape and at least one second section of the outer surface is processed to have a second shape.

4 Claims, 3 Drawing Sheets

METHOD FOR MACHINING A BLADE AND A BLADE FOR A TURBOMACHINE

BACKGROUND OF THE INVENTION

The present invention refers to a method for machining a blade and a blade for a turbomachine comprising a shroud which is positioned on a tip side of the blade having an outer surface with at least one circumferential fin arranged thereon, whereby at least one area of the outer surface beside the at least one fin is machined.

Blades for turbomachines comprising a shroud which is positioned on a blade tip side of the blade are known in the prior art. In some embodiments the outer surface of the shroud is machined. Usually a radially upward facing surface beside a sealing fin, in particular a radially upward facing surface between two adjacent sealing fins, on a shroud of a casted blade is machined, in particular grinded, milled or electrochemical machined, after the casting process, e.g. for providing a more defined surface with tighter tolerances. In embodiments comprising welded hardfacing elements, the machining can additionally or alternatively serve for restoring the surface after welding by removing welded material from the surface. In some embodiments the outer surface of the shroud is machined circumferentially, for example circularly around the rotation axis of the rotor comprising the blade and the turbomachine, respectively. In particular, the circumferential machining provides a surface shaped for enabling a tight distance to the outer air seal of the turbomachine.

Different areas of the outer shroud are subject to different strength requirements, in particular, if the outer shroud comprises recesses and/or reinforcement ribs in particular adjacent to the recesses which are subject to bending forces. Also the weight of the outer shroud is an important issue, which is closely related to the strength requirements. So far, the machining of the outer surface, in particular of the radially upward facing surface beside a sealing fin and/or between two adjacent sealing fins, of the shroud, in particular within a single machining operation along a corresponding machining path, such as a circular arc of a circle with a center on the axis of the turbomachine, has not allowed strength and/or weight requirements of the shroud to be taken into account.

SUMMARY OF THE INVENTION

Therefore, it is an object of this invention to provide an improved method for machining a blade and an improved blade for a turbomachine which enables taking into account the strength and/or weight requirements of different areas of the shroud by way of machining the outer surface of the shroud which is positioned on a tip side of the blade.

An improved method for machining a blade for a turbomachine and a respective blade is achieved by the solution of the independent claims. Further developments of the invention are provided by the subject matter of the dependent claims.

In a first aspect, the invention proposes a method for machining a blade for a turbomachine comprising a shroud which is positioned on a tip side of the blade having an outer surface with at least one circumferential fin arranged thereon, whereby at least one section of the outer surface beside the at least one fin is processed in at least two manufacturing steps:
 machining the outer surface along a first machining path and
 machining the outer surface along a second machining path which is different to the first machining path.

The outer surface can be a radially upwardly facing surface and/or the least one section of the outer surface, which is processed in at least two manufacturing steps, can be located between two fin or sealing fins.

The blade can be a casted blade.

The method is proposed for machining a blade for a turbomachine at which tip side a shroud is positioned. At the (radial) outer side of the shroud at least one fin is arranged which is circumferentially aligned with regard to the rotation direction of the turbomachine. Usually the radial thickness of such fins is constant in circumferential direction. The design of shrouds having at least one circumferentially aligned fin is called dogbone-shaped. Such a design permits a high degree of reinforcement in both the circumferential direction and the axial direction.

In one step, the outer surface is machined along a first machining path. "Machining" in the sense of the invention does in particular mean a material removing manufacturing process, as for example grinding, milling or electrochemical machining. A first machining is often used to remove or level residues after welding of hardfacing elements or for removing additional material after welding. With this first machining step, it is possible to adapt the thickness of the outer shroud of the blade. Dependent on the position and the path of the machining, more or less material can be removed from the shroud of the blade, thereby forming sections with uniform or different strength and/or uniform or different weight properties.

In a further step, which in the process flow can also be applied before the aforementioned step, the outer surface is machined along a second machining path, which is different to the first machining path. Also by way of this machining step, it is possible to adapt the thickness of the shroud differently in diverse areas of the outer shroud of the blade. Dependent on the position and the path of the machining, more or less material can be removed from the shroud of the blade, thereby forming sections with uniform or different strength and/or uniform or different weight properties.

The first and second machining paths for example each may have a linear course or a curved course, in particular running circumferentially around a machining axis, in particular along a circular arc of a circle with a center on the rotation axis (A) of the turbomachine, which is different from one another. Similarly, the first and/or second machining path may also have a free-form course, comprising different curvatures and/or linear sections merging into each other. Also the machining direction of the second machining path can differ from the first machining path. In an embodiment the first and/or second machining path can be angled with regard to the other machining path or also curved or in any other manner different to the other machining path.

The proposed method for machining a blade for a turbomachine comprises at least two machining operations of the outer surface of the shroud adjacent the at least one fin. Thereby, the local thickness of different areas of the shroud can be customized. Multiple path machining can allow to freely remove material and thereby adjust the mass of shroud portions between the pressure side and the suction side of the outer shroud. In this way, the proposed solution allows a controllable balance which can improve the stress distribution and/or creep behavior of the shroud.

In an embodiment of the method the first machining path or the second machining path runs circumferentially around a machining axis, in particular along a circular arc of a circle with a center on the rotation axis (A) of the turbomachine.

A machining path running circumferential around a machining axis results in a surface that is curved around a central axis.

In an embodiment of the method the machining axis corresponds to the rotation axis of the turbomachine. This processing provides a cylindrical surface of the rotor comprising a plurality of blades arranged circumferentially for enabling a tight distance to the outer air seal of the turbomachine. Often, the radial inner surface of the shroud also has a cylindrical shape with regard to the rotation axis to the turbomachine. Then the shroud has an essentially constant wall thickness, in particular at least on the respectively machined surface section. Some embodiments of blades have recesses with reinforcement ribs arranged therebetween. In such a design in particular the surface of the ribs of the shroud are processed by the at least two manufacturing steps. If the machining axis runs circumferentially around the rotation axis of the turbomachine and the radial inner surface of the shroud has a cylindrical shape with regard to the rotation axis, this processing provides an essentially constant wall thickness and an essentially constant radial reinforcement rib height.

In an embodiment of the method the first and/or second machining path is a linear machining path. If the linear machining path intersects a cylindrical surface tangentially, at the tangential intersection between the circumferential and the linear machining, the most material is removed. Thereby the thickness reduction is highest at the tangential intersection of such a design, where in particular a segment of the outer surface is removed. In this way, a linear machining path allows removing material in particular in the area of the tangential intersection of the linear machining path with the circumferential machining path, whereby in an area more remote from the tangential intersection less or no material is removed and the thickness of the outer shroud is less reduced or remains unchanged. In this way, the height and thus the bending moment of for example reinforcement ribs is adjustable due to structural needs. Reinforcement ribs or portions thereof with lower forces acting thereon during use, e.g. located circumferentially and/or axially outside of an airfoil profile of the blade, may be machined to a smaller height and may therefore have a more lightweight design.

In an embodiment of the method where the first and/or the second machining path is a linear machining path, the first machining path and/or the second machining path is running along or inclined to a plane arranged perpendicular to a center line of the blade. In an embodiment where both, the first and second machining paths are linear machining paths, the first and the second machining paths can be inclined in opposite directions to the plane. Thus the area and mass of removed material and thereby the remaining thickness of the shroud can zonally be adjusted due to the needs of strength and weight requirements. The outer surface of the shroud and/or of arranged ribs can thereby be changed from for example a curved to a flat shape. For example, if the shroud comprises more than two reinforcement ribs, the radial height of the ribs can be adjusted to be in particular linearly increasing or decreasing or to have substantially equal radial height.

In an embodiment of this method the inclination of the first machining path and/or the second machining path to the plane is between 0.1° and 6°, in particular between 1° and 4°, in particular between 2° and 3° and in particular 2.4°. The inclination of the linear machining path depends on the design of the outer shroud and the intended scope of the adjustment of the thickness of the shroud and of arranged ribs.

In an embodiment of the method the first machining path and/or the second machining path is a freeform path. A freeform path of machining allows most degrees of flexibility with regard to the design of the surface, in particular with regard to the thickness of the shroud and of arranged ribs.

In a further embodiment of the method the machining area transverse to the first machining path and/or the second machining path is inclined with regard to the axial direction of the rotation axis. Such a machining process produces an at least zonally tapered surface on the outer shroud and can further be applied for providing areas of the shroud having higher or lower strength or different weight properties. Also, the thickness of at least sections of the area of the outer shroud can be machined to increase or decrease with regard to the axial direction of the turbomachine.

In a further embodiment of the method, the machining process along the first and/or second machining path is grinding. The grinding wheel is thereby moved along the machining path, in particular circumferentially around an axis, linearly or along any other formation of machining path. Grinding is a manufacturing process providing tight tolerances and/or can be used for flattening the outer surface of the shroud in particular after welding of a hardfacing element or for removing additional material after welding or the like.

Preferably the grinding wheel rotates about an axis which is parallel or essentially parallel to the axial direction of the turbomachine, e.g. with a maximal deviation of ±5° or ±10° from the axial direction.

In a second aspect, the invention proposes a blade for a turbomachine, comprising a shroud which is positioned on a tip side of the blade having an outer surface with at least one circumferential fin arranged thereon, whereby at least one area of the outer surface beside the at least one fin is machined such that at least one first section of the outer surface has a first shape and such that at least one second section of the outer surface has a second shape that is different to the shape of the first section. In particular the first and second sections of the outer surface are machined sections.

An exemplary method for manufacturing such a blade is disclosed in the preceding description. Specific features and characteristics of a blade mentioned in the foregoing apply to the different embodiments of the blade in particular as proposed in the second aspect.

At a tip side of the blade a shroud is positioned, having at least one fin circumferentially aligned with regard to the rotation direction of the turbomachine. The radial thickness of such a fin is usually constant in circumferential direction. This kind of shroud design is called "dogbone-shaped" and permits a high degree of reinforcement of the shroud and the blade, respectively in both the circumferential direction and the axial direction.

At least one area of the outer surface beside the least one fin is machined by at least two machining steps. The first section of the outer surface has a first shape and is for example curved around a central axis. At least one second section of the outer surface has a second shape that is different to the first section. Thus, the thickness of the shroud varies according to the shape in the at least one first and second sections of the outer shroud, thereby providing sections with higher or lower strength and/or different weight properties.

The proposed blade for a turbomachine comprises at least two differently machined sections of the outer surface of the shroud beside the at least one circumferentially arranged fin. By way of the different machining the local thickness of different areas of the shroud is customized for example for adjusting the mass of shroud portions between the pressure side and the suction side of the outer shroud and for adapting strength and weight properties of shroud portions. In this way, the proposed solution provides a blade with in particular controllable balance, improved stress distribution and/or creep behavior of the shroud.

In an embodiment of the blade, the first section and/or the second section has a cylindrical shape. A cylindrical shape allows a tight distance to the outer air seal of the turbomachine. Often, the radial inner surface of the shroud also has a cylindrical shape with regard to the rotation axis to the turbomachine. Then the shroud has an essentially constant wall thickness.

In an embodiment of the blade a section of the outer shroud having a cylindrical shape has an essentially constant wall thickness in circumferential direction and a section of the outer shroud having a different than a cylindrical shape has different wall thicknesses. In many designs the radial inner surface of the shroud also has a cylindrical shape with regard to the rotation axis of the turbomachine. If the first section on the outer shroud surface also has a cylindrical shape with regard to the rotation axis, which is advantageous with regard to a desirable tight distance to the outer air seal of the turbomachine, then this first section has an essentially constant wall thickness.

The outer shroud surface of some embodiments of the blade has recesses with reinforcement ribs arranged therebetween. In some designs these reinforcement ribs in particular have different wall thicknesses, according to the forces acting on the rib during turbomachine activity. Additionally, if there are only low forces acting on a portion of the shroud, in this portion only low wall thicknesses have to be provided, thus reducing the weight of the blade. For example, a basic task of a reinforcement rib is to prevent bending. The rectangular rib bending moment of resistance is $W_b = b/6 \ast h^2$, wherefore the height of the rib determines its strength. Thus, the wall thickness of an outer shroud is adapted to strength requirements and with regard to reduce weight. The proposed design of the blade allows to meet this requirement.

In an embodiment of the blade, the outer shroud comprises at least one recess, wherein at least two areas and/or reinforcement ribs adjacent to the at least one recess have different wall thicknesses. In such a design, the at least two areas and/or ribs may have different wall thicknesses providing different strength and weight properties according to structural needs of the outer shroud.

In an embodiment of the blade the outer shroud is machined according to the method as described above. Specific features and characteristics of a blade mentioned apply to different embodiments of the blade.

In a further aspect, a turbomachine comprising a blade as described above is provided.

BRIEF DESCRIPTION OF THE DRAWING FIGURES

Further advantages, features and possible applications of the present invention will be described in the accompanying drawing figures in which.

DESCRIPTION OF THE INVENTION

Figure 1:
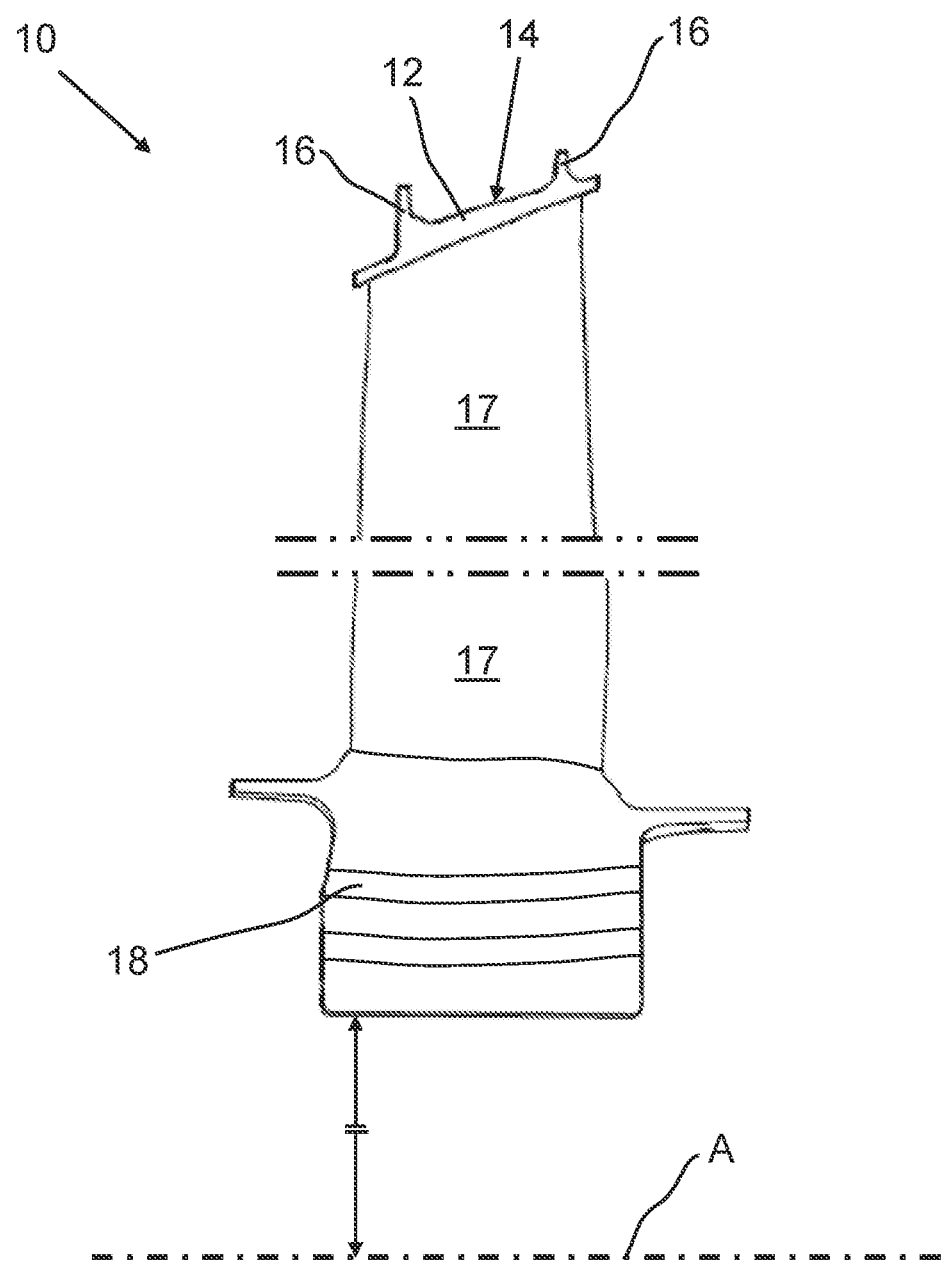
FIG. 1 is a schematic representation of an exemplary blade for a turbomachine having a shroud positioned on the tip side.

FIG. 1 shows a schematic representation of an exemplary blade 10 for a turbomachine having a shroud 12 positioned on the tip side of the blade 10. The shroud 12 comprises an outer surface 14 with two circumferential fins 16 arranged thereon. On the opposite side of the blade tip, where the shroud 12 is positioned, the blade root 18 is arranged. Between the blade root 18 and the shroud 12, the airfoil 17 of the blade 10 is arranged. In the exemplary embodiment of the blade 10, at least one area of the outer surface 14 of the shroud 12 beside the two fins 16 is processed in at least two manufacturing steps. FIG. 1 also shows the position of the rotation axis A of the turbomachine, where the radial distance of the rotation axis from the blade 10 is broken as in fact the radial distance is clearly larger than shown in FIG. 1.

Figure 2A:
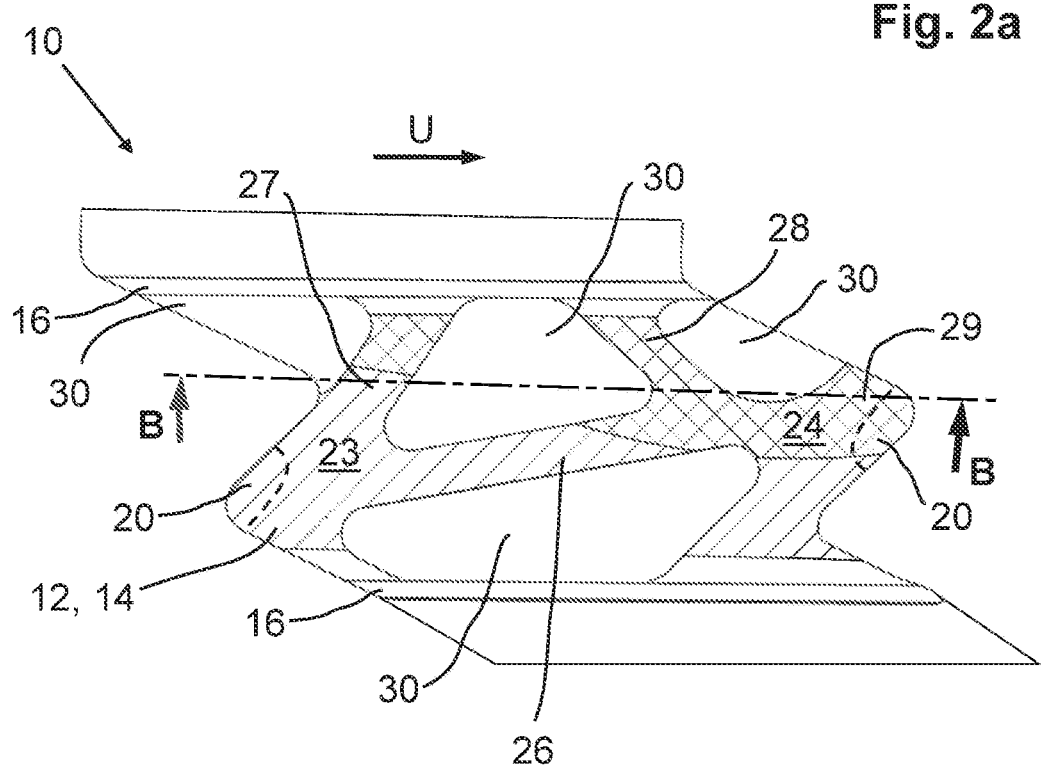
FIG. 2a is a top view on the surface of the shroud of the exemplary blade shown in FIG. 1.

FIG. 2a shows a top view on the outer surface 14 of the shroud 12 of the exemplary blade 10 shown in FIG. 1 which outer surface 14 is processed in at least two manufacturing steps beside the two fins 16. The arrow U indicates the circumferential direction of rotation. At the right hand side in FIG. 2a, the suction side of the blade 10 and shroud 12, respectively, is arranged and at the left hand side the pressure side is arranged. The outer shroud 12 comprises several recesses 30 in form of pockets and several reinforcement ribs 26, 27, 28, 29 adjacent to and also between the recesses 30. FIG. 2a also shows areas 20 in which possible hardfacing elements can be arranged in some embodiments.

As indicated by different hatchings, there are two differently machined sections 23, 24 arranged on the outer shroud 12: In the exemplary embodiment, one area of the outer surface 14 beside the fins 16 is machined such that at least one first section 23 of the outer surface 14 has a cylindrical shape and such that at least one second section 24 of the outer surface 14 has a shape that is different to the first section 23. In an embodiment of the invention, this is achieved by machining the outer surface 14 along a first machining path 33 running circumferentially around a machining axis C (see FIG. 2b). For example, axis C can correspond to the rotation axis A of the turbomachine. In a second manufacturing step, the outer surface 14 is machined along a second machining path 34 which is different to the first machining path 33. As is apparent in FIG. 2a, the machining area transverse to the second machining path 24 is inclined with regard to the axial direction of the rotation axis.

Figure 2B:
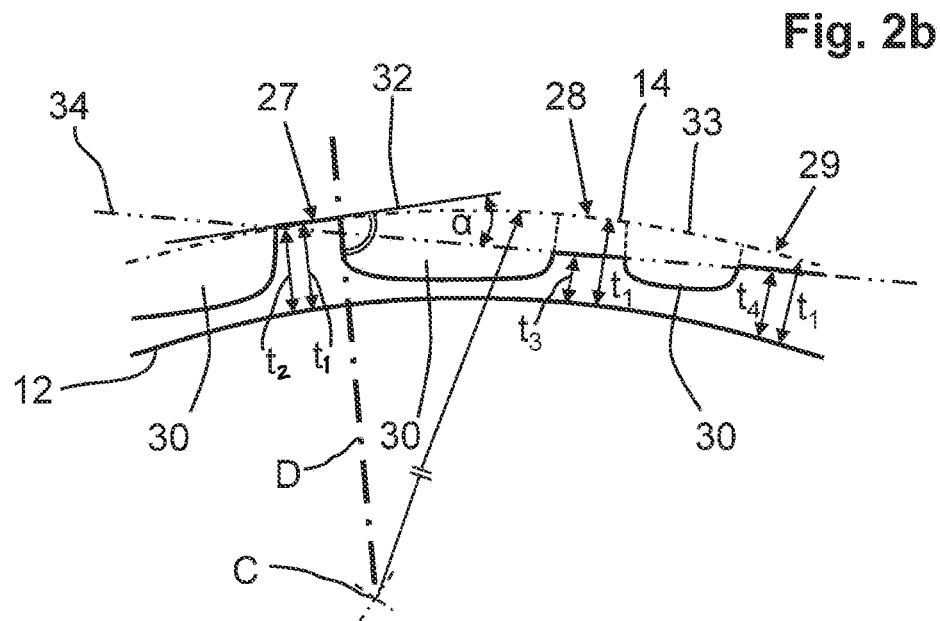
FIG. 2b is a sectional view of the shroud of FIG. 2a along the intersection line B-B.

FIG. 2b shows a sectional view of the shroud 12 of FIG. 2a along the intersection line B-B, shown in FIG. 2a. FIG. 2b illustrates the shroud 12 at the sectional line B-B after the machining operation along the first machining path 33 in dashed lines and the shroud 12 at the sectional line B-B after the machining operation along the second machining path 34 in solid lines.

As can be seen in FIG. 2b, the first machining path 33 is a circumferential path and the second machining path 34 is a linear machining path, which is inclined with respect to a plane 32 arranged perpendicular to a center line D of the blade 10. For example, the inclination α can range from 0.1° to 6°. In FIG. 2b, for better understanding an inclination having a larger angle α than 6° is shown. The machining process used for manufacturing the exemplary embodiment of the blade 10 along the first machining path 33 and the second machining path 34 is grinding.

As is illustrated in FIG. 2b, after the machining step along the first machining path 33, the outer surface 14 of the outer shroud 12 has—beside the recesses 30—an essentially constant wall thickness $t_1$. After machining along the second machining path 34, the outer surface 14 in the second section 24 of the outer shroud 12 has different wall thicknesses $t_2$, $t_3$ and $t_4$. In the exemplary embodiment, reinforcement rib 27 has a wall thickness $t_2$, reinforcement rib 28 has a wall thickness $t_3$ and reinforcement rib 29 has a wall thickness $t_4$, wherein the wall thickness $t_3$ of reinforcement rib 28 is smaller than the wall thicknesses $t_2$ and $t_4$. As the rib bending moment of resistance is $W_b=b/6*t^2$, the wall thickness t of the rib determines the strength of the rib. For weight reduction, material is removed from the reinforcement ribs with less strength requirements. In the exemplary embodiment of the blade 10, more than two sections 23, 24 and/or reinforcement ribs 26, 27, 28, 29 adjacent to the recesses 30 have different wall thicknesses $t_2$ to $t_4$.

Figure 2C:
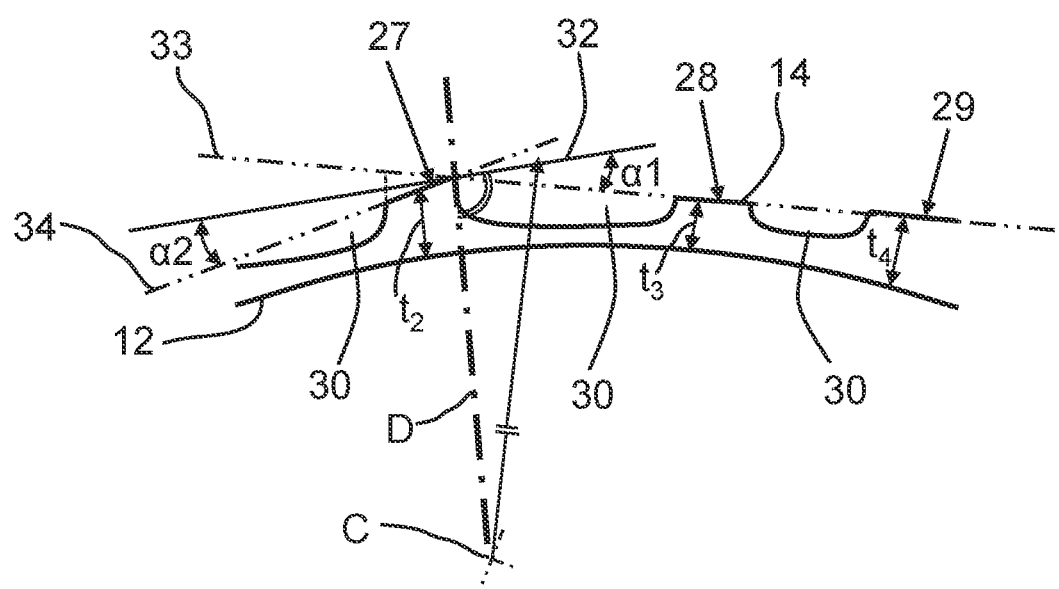
FIG. 2c is a further sectional view of the shroud of FIG. 2a along the intersection line B-B having a different second machining path.

FIG. 2c shows a further sectional view of the shroud 12 of FIG. 2a along the intersection line B-B, shown in FIG. 2a having a different second machining path. FIG. 2c illustrates the shroud 12 at the sectional line B-B after the first machining operation along the first linear machining path 33 and after the machining operation along the second also linear machining path 34.

As can be seen in FIG. 2c, the first machining path 33 and the second machining path 34 are linear machining paths, which are inclined with respect to the plane 32 arranged perpendicular to a center line D of the blade 10. The inclination α1 of the first machining path 33 is arranged in opposite direction of the inclination α2 of the second machining path 34. In FIG. 2c the inclinations are shown having an angle α1, α2 of more than 6°. Also the machining process used for manufacturing the exemplary embodiment of the blade 10 of FIG. 2c is grinding.

It would be appreciated by those skilled in the art that various changes and modifications can be made to the illustrated embodiments without departing from the spirit of the present invention. All such modifications and changes are intended to be covered by the appended claims.

What is claimed is:

1. A blade for a turbomachine having a rotation axis, comprising a shroud which is positioned on a tip side of the blade having an outer surface with at least one circumferential fin arranged thereon, comprising:
    a rib structure having a top surface; the top surface having a first section and a second section;
    the first section of the top surface being cylindrical in shape and extending circumferentially about the rotation axis of the turbomachine; at the first section, the shroud having a constant radial thickness; and
    the second section of the top surface being entirely linear in shape; at the second section, the shroud having a varying radial thickness, and
    wherein the first section extends from a first shroud edge and transitions to the second section, wherein the second section extends to a second shroud edge.

2. The blade for a turbomachine according to claim 1, wherein the outer surface of the shroud comprises at least one recess, and wherein the rib structure has at least two ribs adjacent to the at least one recess, the radial thickness of the shroud at the at least two ribs being different with respect to each other.

3. A blade for a turbomachine, comprising a shroud which is positioned on a tip side of the blade having an outer surface with at least one circumferential fin arranged thereon, comprising:
    a rib structure having a top surface; the top surface having a first section and a second section;
    the first section of the top surface being linear in shape and oriented at a first angle relative to a plane arranged perpendicular to a center line of the blade; at the first section, the shroud having a varying radial thickness; and
    the second section of the top surface being linear in shape and oriented at a second angle relative to the plane arranged perpendicular to the center line of the blade and with a recess circumferentially between the first section and the second section of the top surface of the rib structure; at the second section, the shroud having a varying radial thickness; the second angle being different than the first angle.

4. The blade for a turbomachine according to claim 3, wherein the recess is at least one recess; the outer surface of the shroud comprises the at least one recess, and wherein the rib structure has at least two ribs circumferentially adjacent to the at least one recess, the radial thickness of the shroud at the at least two ribs being different with respect to each other.

* * * * *